United States Patent [19]

Bogema et al.

[11] 4,290,515

[45] Sep. 22, 1981

[54] TRANSMISSION WITH RESILIENT SHIFTING MECHANISM

[75] Inventors: Edward J. Bogema, Vicksburg; Elmer A. Richards, Kalamazoo, both of Mich.

[73] Assignee: Eaton Corporation, Cleveland, Ohio

[21] Appl. No.: 934,102

[22] Filed: Aug. 15, 1978

[51] Int. Cl.³ .............................................. F16D 13/00
[52] U.S. Cl. ................................. 192/53 C; 192/53 F; 192/114 T
[58] Field of Search .............. 192/53 F, 53 C, 114 T; 403/359

[56] References Cited

U.S. PATENT DOCUMENTS

| | | | |
|---|---|---|---|
| 1,136,557 | 4/1915 | Ross | 403/359 X |
| 2,089,168 | 8/1937 | Brown | 403/359 X |
| 2,306,543 | 12/1942 | Burr | 192/114 T X |
| 2,440,775 | 5/1948 | Land | 403/359 |
| 3,367,462 | 2/1968 | Bibbens | 192/114 T X |
| 3,799,002 | 3/1974 | Richards | 74/745 |
| 3,910,131 | 10/1975 | Richards | 74/331 |
| 3,921,469 | 11/1975 | Richards | 74/339 |
| 3,924,484 | 12/1975 | Richards | 74/331 |
| 3,983,979 | 10/1976 | Richards | 74/339 X |
| 4,013,153 | 3/1977 | Morino | 192/114 T |
| 4,115,002 | 9/1978 | Spicer | 192/114 T X |

Primary Examiner—William H. Schultz

Attorney, Agent, or Firm—R. J. McCloskey; H. D. Gordon

[57] ABSTRACT

An improved shiftable change speed transmission is provided. The improved transmission is preferably provided with at least one countershaft having countershaft gears thereon disposed in meshing engagement with main shaft gears encircling the transmission main shaft. Gears are selectively axially movable relative to the associated shaft by conventional means for effecting shifting of the transmission. The axially movable gears cooperate with clutch rings which surround and are supported on and for rotation with the associated shaft by splines, preferably the clutch rings also are axially movable relative to the associated shaft and are resiliently urged in a direction toward the respective gear with which same cooperates, whereby shifting of the axially movable gear toward its respective clutch ring causes resilient axial movement of the latter until synchronization is achieved to permit the clutch ring to move axially in response to said resilient urging and engage the main shaft gear. The improvement comprises providing spline teeth on the clutch ring or the associated shaft which are of a substantially constantly varying thickness and are arranged such that, when the clutch rings are in the non-axially displaced position, the circumferential spacing betwen cooperating clutch ring and shaft-spline teeth is smaller at the axial end of the clutch ring closest to the gear with which it is associated than at the other end of the clutch ring.

11 Claims, 10 Drawing Figures

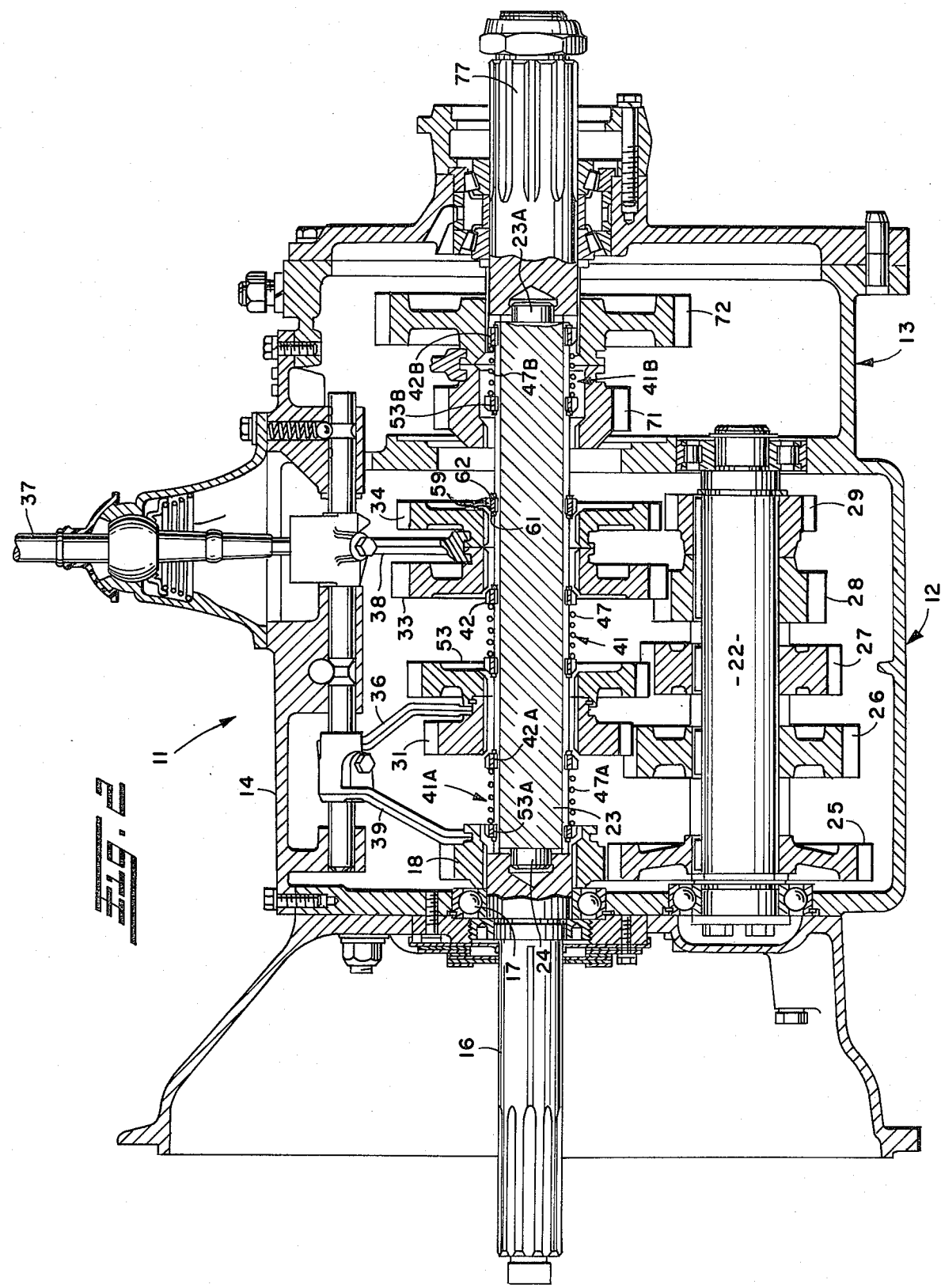

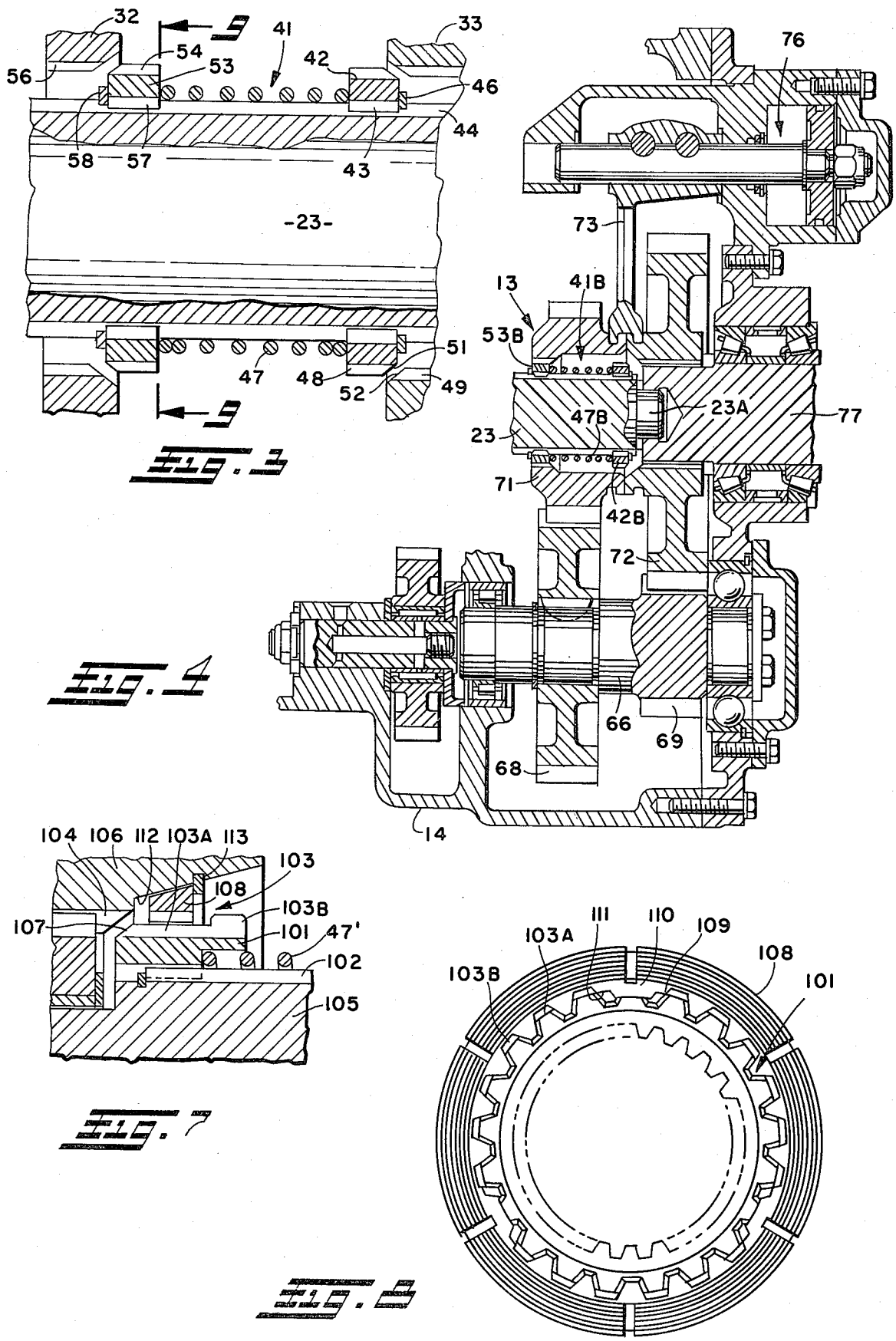

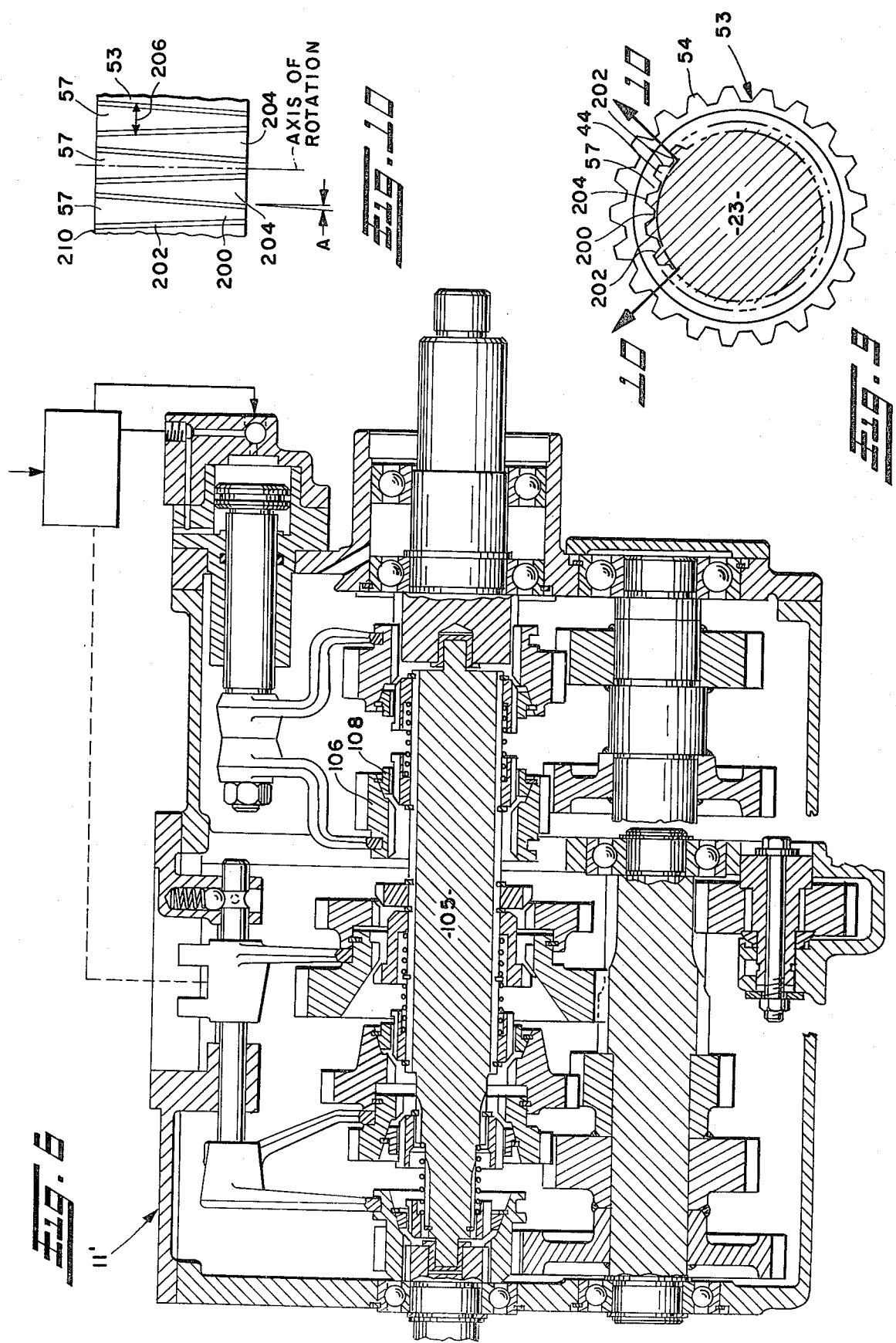

TRANSMISSION WITH RESILIENT SHIFTING MECHANISM

BACKGROUND OF THE INVENTION

1. Field of the Invention

This invention relates to shiftable change speed shifting mechanisms comprising selectively, axially movable gears and, in particular, relates to multiple countershaft transmissions utilizing resiliently yieldable shifting mechanism comprising selectively, axially movable main shaft gears having clutch teeth associated therewith and axially movable, resiliently biased clutch collars splined to the main shaft for selectively rotationally fixing said main shaft gears to said main shaft, said clutch collars having clutch teeth associated therewith for engaging the clutch teeth associated with said main shaft gears, wherein the spline teeth of one of the main shaft or clutch collar are of a constantly variable thickness to prevent or minimize undesired disengagement of an engaged mainshaft gear and clutch collar.

2. Description of the Prior Art

Change speed transmissions utilizing resiliently yieldable shifting mechanisms incorporating selectively, axially movable gears and, in particular, multiple countershaft, floating main shaft transmissions utilizing resiliently yieldable shifting mechanisms, are known in the prior art and may be seen by reference to U.S. Pat. Nos. 3,799,002; 3,910,131; 3,921,469; 3,924,484; and 3,983,979, all of which are assigned to the assignee of this invention and all of which are hereby incorporated by reference.

Briefly, the above mentioned multiple countershaft, floating main shaft transmissions utilizing resiliently yieldable shifting mechanisms comprise selectively, axially movable main shaft gears and axially movable clutch collars splined to the main shaft which are resiliently biased toward said main shaft gears and which are positively stopped from moving into engagement therewith until said main shaft gears are axially moved toward said clutch collars. The main shaft gears have clutch teeth associated therewith, preferably integral internal clutch teeth, and the clutch collars have integral external clutch teeth which are adapted to engage the clutch teeth associated with said main shaft gears. In the preferred embodiments of the above mentioned transmissions, various types of blockers are utilized to prevent engagement of the clutch teeth until the main shaft gear selected to be rotationally fixed to the main shaft is rotating at a synchronous speed with the main shaft. The main shaft gears are selectively, axially movable by shift fork mechanisms as is well known in the prior art and the shift fork mechanisms were manipulated by either a linkage mechanism or by a pressure fluid motor, such as an air cylinder, as is also well-known in the prior art.

While the above mentioned transmissions have proven to be highly desirable, especially for substantially simplifying shifting of the transmissions, in certain circumstances, especially in those transmissions utilizing air motor manipulated shift forks, the clutch teeth associated with certain engaged main shaft gears occasionally tended to undesirably disengage from the clutch teeth associated with the engaged clutch collar. This problem, which is sometimes referred to as "kick out", most often occurred during severe usage of the transmission. Such undesirable disengagement, or "kick out", while not completely understood, is believed to be caused by the engaged, selectively axially movable main shaft gear wobbling in respect to the axis of rotation of the main shaft which is believed to cause the main shaft gear to move axially against the shift fork and the bias of the shift cylinder until the clutch teeth associated therewith became disengaged from the clutch teeth associated with the clutch collar. The problem of undesirable disengagement, although not fully understood, is most often associated with those types of multiple countershaft transmissions wherein the main shaft gear is selectively axially moved toward engagement with a clutch collar, rather than with those types of transmissions wherein the main shaft gear is axially fixed with respect to the main shaft.

SUMMARY OF THE INVENTION

In accordance with the present invention, the prior art transmissions have been improved to the extent that a shiftable change speed transmission utilizing resiliently yieldable shifting mechanisms comprising a selectively, axially movable main shaft gear and an axially movable, resiliently biased clutch collar splined to the main shaft is provided which greatly minimizes or eliminates the problem of undesired disengagement during operating conditions. The above is accomplished by utilizing a clutch collar which is splined to the main shaft wherein the splines, also called "spline teeth", of the clutch collar or the main shaft are of a substantially constantly variable circumferential thickness. The constantly variable thickness spline teeth of the clutch collar or main shaft are arranged such that the spline teeth are thickest at the axial end of the clutch collar closest the main shaft gear with which it is associated when the clutch collar is in the axially non-displaced position. In the preferred embodiment, for manufacturing reasons, the clutch collar is the member carrying the constantly variable thickness spline teeth, thus the spline teeth of the clutch collar are of a greater circumferential thickness at the axial end thereof closest the main shaft gear with which the clutch collar is associated. The sides of the constantly variable spline teeth define an angle with respect to a line parallel to the axis of rotation of the clutch collar in the range of about ¼° to 2° (preferably about ½°).

Accordingly, it is an object of the present invention to provide a new and improved change speed transmission utilizing shifting mechanisms comprising selectively axially movable gears.

Another object of the present invention is to provide an improved change speed transmission having resiliently yieldable shifting mechanisms comprising selectively, axially movable main shaft gears having clutch teeth associated therewith and axially movable clutch collars splined to the main shaft and biased toward the main shaft gear, said clutch collars positively stopped from engaging the main shaft gears in the disengaged position thereof, the splines of the clutch collar or the main shaft being of a constantly variable circumferential thickness to prevent or minimize undesired disengagement of an engaged main shaft and clutch collar.

These objects and advantages of the present invention will become apparent from a reading of the detailed description of the preferred embodiment taken in view of the accompanying drawings.

BRIEF DESCRIPTION OF THE DRAWINGS

FIG. 3 is an enlarged fragmentary view of the improved resilient clutch structure of the embodiment of FIG. 1 according to the present invention.

FIG. 4 is a sectional view of the embodiment of FIG. 1 as taken substantially along the lines IV—IV in FIG. 5.

FIG. 5 is a sectional, elevational view taken along the lines V—V in FIG. 1.

FIG. 6 is a cross sectional view similar to FIG. 2 of an alternate embodiment of the present invention.

FIG. 7 is a portion of FIG. 6 on an enlarged scale.

FIG. 8 is an elevational view of a slidable clutch component and its associated blocker as viewed from the left in FIG. 6.

FIG. 9 is a sectional view taken on the line IX—IX in FIG. 4.

FIG. 10 shows the clutch collar fragmentarily in an unwrapped condition taken along the lines X—X in FIG. 9.

DESCRIPTION OF THE PREFERRED EMBODIMENT

Figure 1:
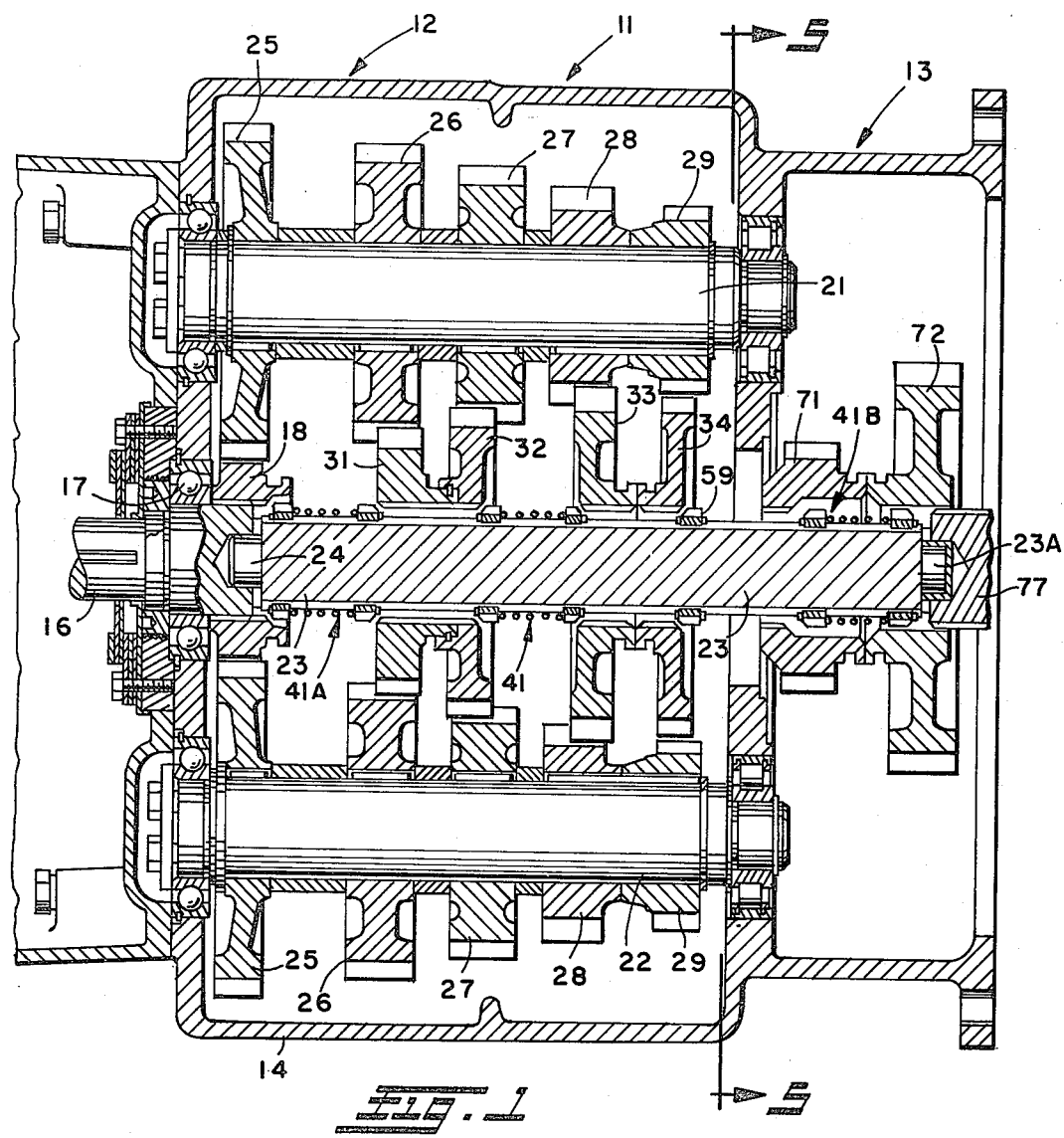
FIG. 1 is a cross sectional view of one embodiment of the improved transmission of the present invention as taken substantially along the lines I—I in FIG. 5.
Figure 2:
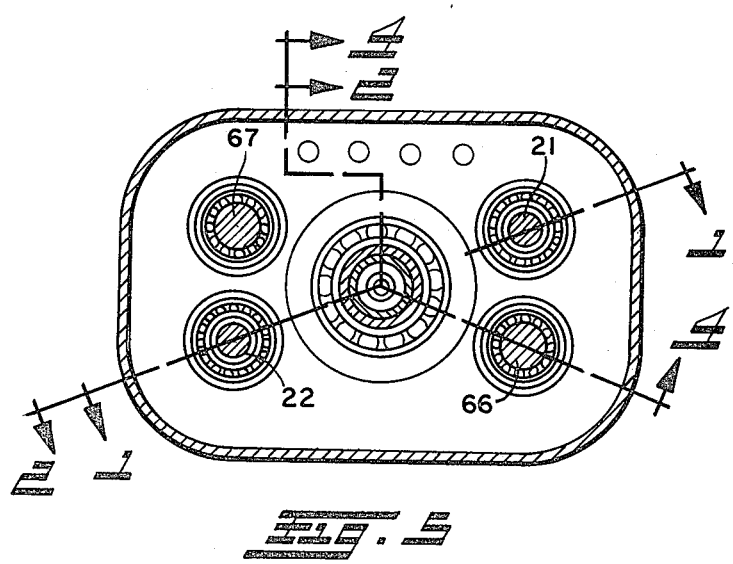
FIG. 2 is a cross sectional view of the improved transmission of FIG. 1 taken substantially along the lines II—II in FIG. 5.

Certain terminology will be used in the following description for convenience and reference only and will not be limiting. The words "upwardly", "downwardly", "rightwardly", and "leftwardly" will designate directions in the drawings to which reference is made. The words "forward" and "rearward" will refer respectively to the front and rear ends of the improved transmission as same is conventionally mounted in the vehicle, being respectively the left and right sides of the transmission as is illustrated in FIGS. 1 and 2. The words "inwardly" and "outwardly" will refer to directions toward and away from, respectively, the geometric center of the device and designated parts thereof. Said terminology will include the words above specifically mentioned, derivatives thereof, and words of a similar input.

The present invention relates to a spline structure for interconnecting clutch collars to main shafts in transmissions of the type utilizing selectively axially movable mainshaft gears. For purposes of illustration, the transmissions illustrated are of the type having resiliently yieldable shifting mechnisms, it being understood the invention is equally applicable to transmissions wherein the clutch collars are axially fixed with respect to the mainshaft. Further, for purposes of simplifying illustration of the present invention, the resiliently yieldable shifting mechanisms illustrated in FIGS. 1, 2, 3, 4, 8 and 9 are of the type not utilizing blockers, it being understood the invention is equally applicable to resiliently yieldable shifting mechanisms utilizing blockers and that in the preferred embodiment such resiliently yieldable shifting mechanisms do utilize blockers.

Change speed transmissions of the type illustrated in the drawings having resiliently yieldable shifting mechanisms wherein the mainshaft gears are selectively axially movable and the axially movable clutch collars are splined to the mainshaft and are resiliently biased toward the mainshaft gear associated therewith are illustrated in U.S. Pat. No. 3,799,002, assigned to the assignee of this invention and hereby incorporated by reference. Improved blocker constructions for such transmissions are illustrated in U.S. Pat. Nos. 3,921,469; 3,924,484; and 3,983,979, which are also assigned to the assignee of this invention and hereby incorporated by reference.

Referring to FIGS. 1, 2, 3, 4, 9 and 10, there is illustrated a transmission 11 having both a main transmission section 12 and a range or auxiliary transmission section 13, each of which has a plurality of selectable ratios. The main and range sections are both suitably enclosed by a conventional housing 14.

The transmission 11 specifically includes an input shaft 16 supported adjacent its rearward end by a bearing 17 and provided with an input gear 18 nonrotatably connected thereto, as by splines. The input gear 18 simultaneously drives a plurality of countershafts at equal speeds. In the illustrated embodiment, the transmission is provided with two countershafts 21 and 22 disposed on diametrically opposite sides of the main shaft 23, which main shaft is coaxially aligned with the input shaft 16 and is provided with a pilot portion 24 on its forward end rotatably received within and supported by the rearward end of the input shaft 16.

Each of the countershafts 21 and 22 is provided with an identical grouping of countershaft gears 25, 26, 27, 28 and 29 thereon, which groupings form pairs of gears, such as the pair of gears 26, of identical size and number of teeth and disposed on diametrically opposite sides of the main shaft 23.

A plurality of main shaft drive gears 31, 32, 33 and 34 encircle the main shaft and are selectively clutchable thereto one at a time by yieldable clutch mechanisms, as described in greater detail hereinafter.

The main shaft gears 31, 32 and 33 encircle the main shaft 23, are in continuous meshing engagement with, and are floatingly supported by, the diametrically opposed pairs of countershaft gears 26, 27 and 28, respectively, which mounting means and the special advantages resulting therefrom are explained in greater detail in U.S. Pat. Nos. 3,105,393, and 3,335,616. The main shaft gear 34 is the reverse gear and is in continuous meshing engagement with the pair of countershaft gears 29 by means of conventional intermediate gears (not shown). The forwardmost countershaft gears 25 are continually meshed with and driven by the input gear 18 for causing simultaneous rotation of the countershafts 21 and 22 whenever the input shaft 16 is rotatably driven.

As illustrated in FIG. 2, the main shaft gears 31 and 32 are axially interconnected to form a gear pair and are connected to a conventional shift fork 36, the position of the shift fork 36 being controlled in a conventional manner by means of a shift lever 37. The main shaft gear pair 31-32 is thus shiftable axially relative to the main shaft 23 in response to axial shifting of the fork 36 by the lever 37. However, the gears 31 and 32 are independently rotatable relative to one another. In a similar manner, the main shaft gears 33 and 34 are also axially interconnected so as to be axially shiftable as a pair by means of the shift fork 38, which shift fork is also controlled by means of the shift lever 37. The main shaft gear pair 33-34 is likewise axially movable relative to the main shaft 23. It is understood that the shift forks may be manipulated b pressure fluid motors as well as by shift levers.

The input gear 18 is also interconnected to a conventional shift fork 39, which shift fork is similarly controlled by the shift lever 37 for permitting input gear 18 to be shifted axially for selectively permitting direct driving engagement between the input shaft 16 and the main shaft 23.

The yieldable clutch structure, as illustrated in detail in FIG. 3, is generally designated 41 and includes an annular clutch collar 42 encircling the main shaft 23. The clutch collar 42 is provided with internal splines 43 which are disposed within corresponding external splines 44 provided on the main shaft 23 for interconnecting the clutch collar 42 to the main shaft 23 for rotation therewith. However, the cooperating splines 43 and 44 permit the clutch collar 42 to freely slide axially relative to the shaft 23. A stop ring 46 is seated within a suitable groove formed on the external periphery of the shaft 23 and is disposed for contacting the clutch collar 42 and limiting the axial movement thereof. The collar 42 is normally resiliently urged by means of a spring 47 into abutting engagement with the stop ring 46.

The clutch collar 42 is provided with external teeth 48 thereon which are adapted to meshingly engage the internal teeth 49 provided on one of the main shaft gears, such as the gear 33. The teeth 48 on the clutch collar 42 are tapered, as at 51, and in a similar manner the leading edge of the teeth 49 on the main shaft gear 33 are similarly tapered as at 52. The confronting tapered conical surfaces 51 and 52 each extend at an angle of preferably between 30 and 40 degrees relative to the longitudinal axis of the main shaft 23. The exact degree of taper, and the advantages thereof, are explained in detail in U.S. Pat. No. 3,265,173. The other end of the spring 47 resiliently acts against a further clutch collar 53, which collar is identical to the collar 42 but is disposed so that it has the tapered leading end of its teeth facing in the opposite direction. The clutch collar 53 has external teeth 54 which are adapted to meshingly engage the internal teeth 56 provided on the main shaft gear 32, the leading edges of the teeth 54 and 56 each being tapered in a manner similar to the tapered surfaces 51 and 52 as explained in detail above. The clutch collar 53 is also provided with internal splines 57 for nonrotatably but axially slidably engaging the external splines 44 on main shaft 23. The clutch collar 53 is resiliently urged by the spring 47 into a position whereby it normally abuttingly contacts a further stop ring 58. The structural details of mainshaft splines 44 and the clutch collar splines such as 57 comprise the improvement of the illustrated transmission and are described in detail below.

A further resilient clutch assembly 41A is disposed concentrically to the main shaft 23 and positioned between the main shaft gear 31 and the input gear 18. The yieldable clutch assembly 41A is identical to the clutch assembly 41 and is disposed for mshing engagement with the internal teeth of either of the main shaft gear 31 or the input gear 18.

The main shaft 23 is additionally provided with a further clutch collar 59 concentrically and nonrotatably mounted thereon, which clutch collar 59 is identical to the clutch collar 42 described above. However, the clutch collar 59 is axially confined relative to the mainshaft 23 by stop rings 61 and 62 disposed on the opposite axial sides thereof. The clutch collar 59 is disposed for meshing engagement with the internal teeth of the main shaft gear 34 when said gear 34 is shifted rightwardly from the position illustrated in FIG. 2. The clutch collar 59 is not resiliently loaded or biased as is true of the clutch assemblies 41 or 41A since the clutch collar 59 is utilized only when the transmission is driving in reverse, and thus the resilient loading of the clutch collar is not necessary. However, a spring could obviously be provided for resiliently loading the clutch collar 59 if so desired.

Considering now the range section 13, same includes a plurality of countershafts 66 and 67 (FIG. 5) each having an identical grouping of countershaft gears 68 and 69 (FIG. 4) thereon. The first pair of countershaft gears 68 are disposed diametrically opposite and in continuous meshing engagement with a main shaft gear 71, which main shaft gear is floatingly supported by the pair of countershaft gears 68 for substantially concentrically encircling the main shaft 23. A further mainshaft gear 72 is also floatingly and substantially concentrically supported relative to the main shaft 23 by the other pair of countershaft gears 69. The pair of main shaft gears 71 and 72 are axially interconnected and axially movable relative to the main shaft 23 by a further shift fork 73 which shift fork is connected to and movable by any automatically controllable power means, such as a piston structure 76. The piston structure 76 is shiftable in a conventional manner, such as by means of a manually actuated, preferably preselectable, range shift button or lever provided in the vehicle occupant compartment, which in turn controls a valve (not shown) for supplying pressure fluid to the piston structure.

As illustrated in FIG. 2, the main shaft 23 extends continuously through not only the main transmission section 12, but also through the range transmission section 13. The rearward end of the main shaft 23 is provided with a pilot portion 23A which is rotatably received and supported within the end of the output shaft 77.

The range section main shaft gears 71 and 72 are each individually clutchably engageable with the main shaft 23 by means of a resilient clutch assembly 41B, which assembly is identical to the assembly 41 described above. The assembly 41B includes clutch collars 42B and 53B splined on the main shaft 23 and resiliently urged axially in opposite directions by means of the intermediate spring 47B. The external teeth formed on the clutch collars 42B and 53B are adapted to respectively meshingly engage the internal teeth formed on the main shaft gears 72 and 71, respectively. The internal teeth on the main shaft gear 72 are also disposed in meshing engagement with corresponding external teeth formed on the output shaft 77 as illustrated in FIG. 2.

In FIGS. 6, 7, and 8, the preferred embodiment of transmission 11, in which blockers or blocking rings, such as illustrated member 108, are utilized in connection with the resiliently biased clutch collars to prevent engagement of the clutch units until synchronous rotation of the units is achieved is illustrated.

The general operation of the transmissions of FIGS. 1-5 and of 6-8 is well defined in the above mentioned patents, especially U.S. Pat. No. 3,921,469, and thus will not be discussed further herein.

The spline structure comprising the improvement of the present invention may best be seen by reference to FIGS. 9 and 10.

FIG. 9 is a cross sectional view of the clutch collar 53 and main shaft 23. The clutch collar 53 is mounted to the main shaft 23 for axial movement relative thereto and for rotational movement therewith by means of internal splines, or spline teeth 57, which mate with external splines, or spline teeth 44, on the main shaft 23. In cross-section the axially extending internal spline teeth 57 are defined by a circumferentially extending top land 200 and a pair of generally radially extending sides or flanks 202. The splined teeth 57 are separated by generally circumferentially extending bottom lands 204. At a given radial distance from the axis of rotation, taken on a plane perpendicular to the axis of rotation, the circumferential distance from one side of a splined tooth 57 to the other side of the splined tooth defines the circumferential thickness 206 of the splined tooth at the axial point the plane passes through the axis of rotation.

In the prior art devices, for all axial points along the axial extension of the splines, at a given radius from the axis of rotation, the circumferential thickness of the splined teeth of the main shaft and of the clutch collar was substantially constant. In sharp contrast, the circumferential thickness 206 of the splines 57 of the improved transmission 11 is constantly variable and increases toward the axial end 210 of the clutch collar closest the main shaft gear with which it is associated. That is, the circumferential thickness 206 of the spline teeth 57 for a given radial distance from the axis of rotation is greater at the axial end 210 of the clutch collar 53 closest the main shaft gear with which the clutch collar is associated.

Referring to FIG. 10, which is a fragmentary view in which the substantially constantly increasing circumferential thickness of the spline teeth 57 is shown in an exaggerated manner for illustrative purposes only, it may be seen that the intersection of the sides 202 with the top or bottom lands defines an angle A with respect to a line L parallel to the axis of rotation. The angle A is in the range of about $\frac{1}{4}°$ to 2° and is preferably about $\frac{1}{2}°$.

Applicants have discovered that by providing clutch rings of the type shown wherein the splined teeth are of a substantially constantly increasing circumferential thickness toward the end of the clutch collars closest the main shaft gear with which the clutch collar is associated, the incidence of undesired disengagement of engaged main shaft gears from their associated clutch collars is substantially reduced or eliminated. Although the causes of undesired main shaft gear disengagement and the reason why the present invention substantially reduces same is not fully understood, it is believed that by providing spline teeth on the clutch collars which are circumferentially thicker at the end thereof which is closest the associated main shaft gear, the forces transmitted from the main shaft gear are transmitted through a point contact which tends to eliminate the tendency of the main shaft gear to move axially against the bias of the shift fork and member biasing the shift fork.

Although this invention has been described in its preferred form with a certain degree of particularity, it is understood that the present disclosure of the preferred form has been made only by way of example and that numerous changes in the details of construction and combination and arrangement of the parts may be resorted to without departing from the spirit and the scope of the invention as hereinafter claimed.

We claim:

1. An improved change speed transmission of the type comprising selectively axially movable gears having clutch teeth associated therewith, clutch collars mounted directly to a shaft by a spline connection for rotative motion with said shaft, said clutch collars carrying clutch teeth for selective engagement with the clutch teeth associated with said gears, the improvement comprising:

said spline connection comprising axially extending interengaged spline teeth formed on the outer surface of said shaft and on the inner surfaces of said clutch collars, the spline teeth on one of said clutch collars and said shaft being of a substantially constantly varying circumferential thickness along at least a portion of the axial extension thereof, said constantly variable thickness spline teeth arranged such that, in the nonengaged position of said clutch collars, the circumferential spacing between cooperating clutch collar and shaft spline teeth is smallest at the end of the clutch collars closest the gear with which it is associated.

2. The improved transmission of claim 1, wherein at least one of said clutch collars is axially movable relative to said shaft, is resiliently biased toward the gear with which it is associated and is positively limited in its axial movement toward the gear with which it is associated.

3. The improved transmission of claims 1 or 2, wherein the spline teeth on said clutch collars are the substantially constantly variable circumferential thickness spline teeth, said spline teeth being of greater thickness at the end of the clutch collars closest the gear with which it is associated.

4. The improved transmission of claim 3 wherein said constantly variable circumferential thickness spline teeth are separated by a circumferentially extending bottom land and said spline teeth are defined by a circumferentially extending top land and flanks extending from said top land to said bottom lands, the lines defined by the intersection of said flanks with said lands defining an angle in the range of about $\frac{1}{4}°$ to 2° with respect to a line parallel to the axis of rotation of said clutch collars.

5. The improved transmission of claim 4 wherein said angle is about $\frac{1}{2}°$.

6. An improved shiftable change speed transmission of the type having at least one countershaft having countershaft gears thereon disposed in meshing engagement with main shaft gears encircling the transmission main shaft, the main shaft gears being selectively axially movable relative to the main shaft and carrying clutch teeth associated therewith, clutch rings mounted by a splined connection directly to said main shaft for rotation therewith and axial movement relative thereto, said clutch rings carrying clutch teeth for selective engagement with the clutch teeth associated with said main shaft gears, the improvement comprising:

said splined connection comprising cooperating, axially extending interengaged splined teeth formed on said clutch collars and said main shaft, the splined teeth on said clutch collars being of a substantially constantly varying circumferential thickness along the axial extension thereof, said substantially constantly variable circumferential thickness splined teeth being of greatest circumferential thickness at the axial end of said clutch collar closest the main shaft gear with which said clutch collar is associated.

7. The improved transmission of claim 6 wherein said constantly variable circumferential thickness splined teeth are separated by circumferentially extending bottom lands and are defined by a circumferentially extending top land and flanks extending from said top land to said bottom land, the lines defined by the intersection of said flanks with said lands defining an angle in the range of about ¼° to 2° with respect to a line parallel to the axis of rotation of said clutch collars.

8. The improved transmission of claim 7 wherein said angle is about ½°.

9. The improved transmission of claims 7 or 8 wherein said transmission comprises multiple countershafts having countershaft gears thereon and said main shaft gears are supported on and solely by the countershaft gears in meshing engagement therewith.

10. The improved transmission of claim 9 wherein said clutch collars are resiliently biased toward said main shaft gears and positively stopped from axial engagement thereof.

11. The improved transmission of claim 10 wherein at least one of said clutch collars carries a blocker for preventing engagement of said clutch collar and the mainshaft gear associated therewith until said mainshaft gear and said mainshaft are rotating at substantially synchronous speed.

* * * * *